(12) United States Patent
Sakaguchi et al.

(10) Patent No.: US 8,783,130 B2
(45) Date of Patent: Jul. 22, 2014

(54) DEVICE TO CONTROL FORCE REQUIRED TO DEPRESS ACCELERATOR PEDAL

(75) Inventors: Shigeyuki Sakaguchi, Yokohama (JP);
Masao Shiomi, Sagamihara (JP);
Masahiro Omori, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/522,808

(22) PCT Filed: Sep. 9, 2010

(86) PCT No.: PCT/JP2010/065512
§ 371 (c)(1),
(2), (4) Date: Jul. 18, 2012

(87) PCT Pub. No.: WO2011/092886
PCT Pub. Date: Aug. 4, 2011

(65) Prior Publication Data
US 2012/0285287 A1    Nov. 15, 2012

(30) Foreign Application Priority Data

Jan. 28, 2010   (JP) ................. 2010-016246

(51) Int. Cl.
*B60K 26/02* (2006.01)
*F02D 11/02* (2006.01)
*F02D 9/10* (2006.01)
*F02D 11/10* (2006.01)

(52) U.S. Cl.
CPC ............. *B60K 26/021* (2013.01); *F02D 9/105* (2013.01); *F02D 11/106* (2013.01); *F02D 11/02* (2013.01)

USPC .................. 74/513; 701/36; 701/70; 701/123

(58) Field of Classification Search
USPC ........................................ 701/36, 70; 74/513
See application file for complete search history.

(56) References Cited

U.S. PATENT DOCUMENTS 7,093,515 B2   8/2006  Yamanoi et al.
7,457,694 B2   11/2008 Nijikata
(Continued)

FOREIGN PATENT DOCUMENTS

JP        9-249043 A    9/1997
JP     2003-120339 A    4/2003
(Continued)

OTHER PUBLICATIONS

U.S. Appl. No. 13/522,844, filed Jul. 18, 2012, Sakaguchi et al.

(Continued)

*Primary Examiner* — Helal A Algahaim
*Assistant Examiner* — Charles J Han
(74) *Attorney, Agent, or Firm* — Foley & Lardner LLP

(57) ABSTRACT

When an accelerator opening angle has reached an accelerator opening angle threshold value APS1 corresponding to a boundary of a range in which a fuel consumption is relatively deteriorated, a pedal effort of accelerator pedal 2 is increased by a pedal effort increment with respect to a base pedal effort. Even in a case where the accelerator pedal is pushed back to reduce the accelerator opening angle due to an increase in pedal effort when the accelerator opening angle exceeds the accelerator opening angle threshold value APS1, cancellation of pedal effort increment is inhibited to thereby ensure suppression of rattling of accelerator pedal 2 contrary to the driver's intention.

11 Claims, 6 Drawing Sheets

(56) References Cited

U.S. PATENT DOCUMENTS

| | | |
|---|---|---|
| 2004/0059482 A1 | 3/2004 | Hijikata |
| 2006/0106505 A1 | 5/2006 | Kuge |
| 2009/0048755 A1 | 2/2009 | Tokimasa et al. |
| 2010/0250084 A1 * | 9/2010 | Takiguchi et al. ............ 701/70 |

FOREIGN PATENT DOCUMENTS

| | | | |
|---|---|---|---|
| JP | 2004-106673 A | | 4/2004 |
| JP | 2004-149110 A | | 5/2004 |
| JP | 2005-014710 A | | 1/2005 |
| JP | 2005132225 A | * | 5/2005 |
| JP | 2006-123604 A | | 5/2006 |
| JP | 2006-137305 A | | 6/2006 |
| JP | 2006-168614 A | | 6/2006 |
| JP | 2006168614 A | * | 6/2006 |
| JP | 2006-315570 A | | 11/2006 |
| JP | 2007-76468 A | | 3/2007 |
| JP | 2007-182196 A | | 7/2007 |
| JP | 2008-201231 A | | 9/2008 |
| JP | 4367089 B2 | | 9/2009 |
| JP | 4367089 B2 | | 11/2009 |
| JP | 4553057 B2 | | 9/2010 |
| KR | 1989-0003574 A | | 4/1989 |

OTHER PUBLICATIONS

Japanese Office Action dated May 14, 2013, (5 pages).
Sakaguchi et al., USPTO Non-Final Office in U.S. Appl. No. 13/522,844, dated May 24, 2013, (20 pages).
Translation of JP 2006-123604, May 18, 2006, (20 pages).
S. Sakaguchi et al., Notice of Allowance U.S. Appl. No. 13/522,844 dated Nov. 25, 2013, (10 pgs.).
Korean Office Action dated Oct. 4, 2013, (5 pgs.).

* cited by examiner

DOWNSHIFT

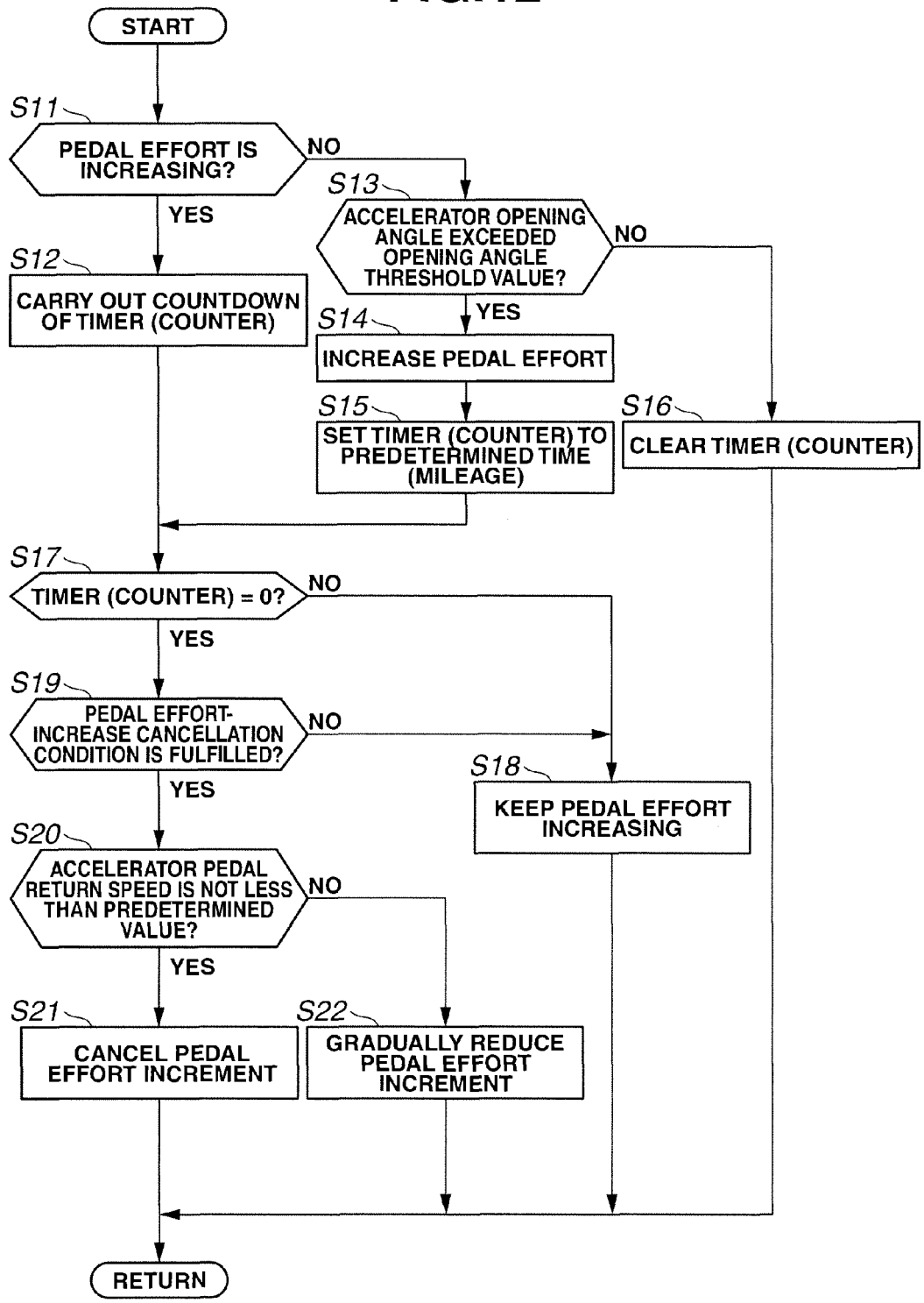

DEVICE TO CONTROL FORCE REQUIRED TO DEPRESS ACCELERATOR PEDAL

This application is a National Stage application of International Application No. PCT/JP2010/065512, filed Sep. 9, 2010, which claims priority to Japanese Application No. 2010-016246, filed Jan. 28, 2010. All of which are hereby incorporated by reference in their entirety.

TECHNICAL FIELD

The present invention relates to an accelerator pedal effort control device that controls a pedal effort of an accelerator pedal of a vehicle.

BACKGROUND ART

Patent Literature 1 discloses a technology applicable to an engine in which a first operating system (for instance, uniform combustion) on a high-rotation high-load side and a second operating system (for instance, stratified charge combustion) on a low-rotation low-load side which has combustion efficiency higher than the first operating system are carried out by changeover therebetween. When an engine operating range changes from a second operating range in which the second operating system is carried out to a first operating range in which the first operating system is carried out, a reaction force (a pedal effort) relative to a depressing force that is applied to an accelerator pedal is rapidly increased in a stage in which the engine operating range has entered into a boundary operating range immediately before changing to the first operating range. An increment of the pedal effort is cancelled when the engine operating range is returned from the boundary operating range to the second operating range.

CITATION LIST

Patent Literature

Patent Literature 1: Japanese Patent Application Unexamined Publication No. 2003-120339

SUMMARY OF INVENTION

Technical Problem

The technology of the Patent Literature 1 aims to reduce specific fuel consumption and cancel both the pedal effort of the accelerator pedal and the increment thereof at the boundary operating range. However, the accelerator pedal is a main operating member in view of operation of a vehicle according to a driver's intention. Further, an operating feeling to be obtained by the driver, and influence on a drivability of the vehicle which is caused due to the operating feeling, are considerably important such as to have a direct relation to evaluation of quality of a whole vehicle. For this reason, upon practically using such a pedal effort control device that serves for reducing fuel consumption, it is necessary to harmonize reduction of the fuel consumption with the accelerator pedal operating feeling or the vehicle drivability at high level.

Inventors of the present invention have prepared many experimental devices and carried out running tests for the purpose of practical use of such a pedal effort control device that serves for reducing fuel consumption. It was found from results of these tests that in a case where the pedal effort was increased or cancelled at a certain accelerator opening angle as a boundary as described in the above Patent Literature 1, undesired behavior of the vehicle was caused by the driver's subconscious response.

Specifically, in the technology of Patent Literature 1, when the accelerator pedal is depressed by the driver, the accelerator pedal may be pushed back contrary to the driver's intention due to a rapid increase in pedal effort which is caused when the operating range is changed from the second operating range to the boundary operating range. As a result, the operating range is allowed to return from the boundary operating range to the second operating range. At this time, there occurs rapid reduction of an increment in the pedal effort rapidly increased when the operating range is changed from the second operating range to the boundary operating range. The driver inherently intends to depress the accelerator pedal, so that an increase in pedal effort is caused by depressing the accelerator pedal. Therefore, the accelerator pedal is necessarily depressed even after the pedal effort is reduced when the operating range is deviated from a boundary operating range. As a result, the operating range is changed from the second operating range to the boundary operating range again, and a rapid increase in pedal effort is carried out again to thereby allow the accelerator pedal to be pushed back again contrary to the driver's intention.

That is, in a case where the driver increases the opening angle of the accelerator pedal so as to move across a boundary at which fuel efficiency of the vehicle is changed, there will occur rattling, i.e., so-called hunting phenomenon, of the accelerator pedal contrary to the driver's intention, thereby causing such a problem that uncomfortable feeling is given to the driver and the vehicle drivability is deteriorated.

Solution to Problem

An accelerator pedal effort control device according to the present invention includes an accelerator opening angle sensing means for sensing an accelerator opening angle that is varied by operating an accelerator pedal of a vehicle, a pedal effort varying means for varying a pedal effort of the accelerator pedal, and a threshold value setting means for setting an accelerator opening angle threshold value relating to specific fuel consumption on the basis of an operating condition of the vehicle, wherein when the accelerator opening angle becomes larger than the accelerator opening angle threshold value, a predetermined increment is added to the pedal effort of the accelerator pedal. In the accelerator pedal effort control device, cancellation of the increment of the pedal effort is inhibited until a predetermined period elapses from a time at which increase in the pedal effort of the accelerator pedal is initiated.

The term "predetermined period" is not particularly limited to a time-based period, and may be, for instance, a period until the running mileage reaches a predetermined running mileage.

Effect of Invention

According to an accelerator pedal effort control device of the present invention, even when an accelerator pedal is pushed back to reduce an accelerator opening angle from an accelerator opening angle threshold value due to increase in pedal effort of the accelerator pedal which results from the accelerator opening angle which exceeds the accelerator opening angle threshold value, an increment of the pedal effort cannot be cancelled until a predetermined period elapses. As a result, a reduction of the pedal effort is not generated, thereby preventing the accelerator pedal from rattling contrary to the driver's intention.

BRIEF DESCRIPTION OF DRAWINGS

FIG. 12 is a flow chart showing a flow of control of the accelerator pedal effort control device according to the embodiment of the present invention.

DESCRIPTION OF EMBODIMENTS

In the following, preferred embodiments of an accelerator pedal effort control device of the present invention are explained in detail by referring to the accompanying drawings. The accelerator pedal effort control device is basically constructed to variably control a pedal effort (operating reaction force) of accelerator pedal 2 mounted to vehicle body 1 of a vehicle (not shown). The accelerator pedal effort control device includes a detecting member that detects an opening angle (a depressing amount) of accelerator pedal 2 and is mounted to the vehicle, and a change member that changes the pedal effort of accelerator pedal 2 from a base pedal effort, as described later. The accelerator pedal effort control device is constructed to increase the pedal effort of accelerator pedal 2 relative to the base pedal effort within a range in which the opening angle of accelerator pedal 2 is larger than a predetermined accelerator opening angle threshold value.

Figure 1:
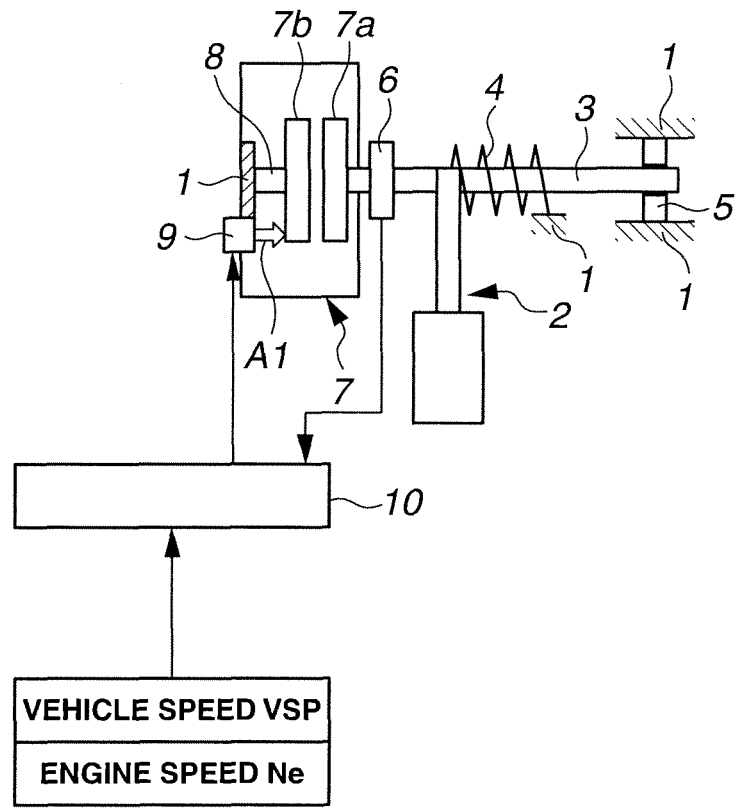
FIG. 1 is an explanatory diagram schematically showing a system construction of an accelerator pedal effort control device according to the present invention together with a general construction of a pedal effort varying mechanism.
Figure 2:
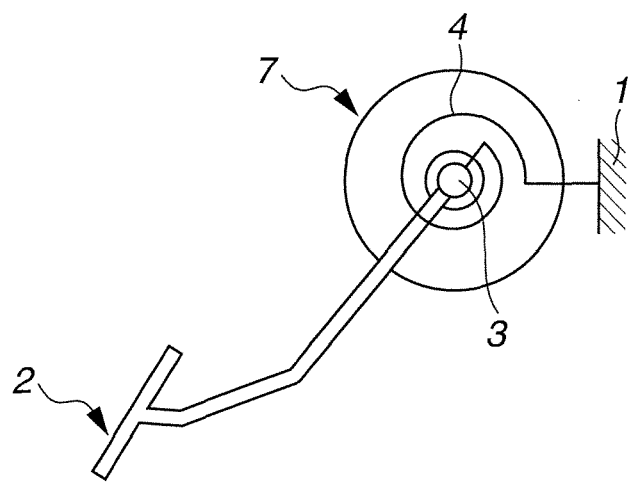
FIG. 2 is an explanatory diagram schematically showing the pedal effort varying mechanism according to an embodiment of the present invention.

As shown in FIG. 1 and FIG. 2, accelerator pedal 2 is disposed on rotating shaft 3 so as to be swingable about rotating shaft 3 as a fulcrum. Accelerator pedal 2 undergoes a reaction force in an accelerator closing direction by return spring 4 of various shapes which has one end fixed to vehicle body 1 and the other end fixed to rotating shaft 3. One end of rotating shaft 3 is supported to vehicle body 1 through bearing 5. Disposed near the other end of rotating shaft 3 is accelerator position sensor 6 as an accelerator opening angle sensing member which outputs accelerator opening angle signal APS. Further, there are provided an engine speed sensor (not shown) which detects engine speed Ne, and a vehicle speed sensor (not shown) which detects vehicle speed VSP.

In this embodiment, an amount of depression of accelerator pedal 2 (an accelerator opening angle) and an opening angle of a throttle valve (not shown) of an engine (not shown) are varied in association with each other. The opening angle of the throttle valve is increased in accordance with increase in amount of depression of accelerator pedal 2. That is, a fuel injection amount (and a fuel consumption) is increased in accordance with increase in accelerator opening angle.

A pedal effort varying mechanism is constituted of variable friction plate 7 including a pair of mutually opposed friction members 7a, 7b which apply a friction force to rotating shaft 3 to suppress rotation thereof. One friction member 7a is mechanically connected to an end portion of rotating shaft 3. The other friction member 7b is supported on stationary shaft 8 through a spline or the like so as to be moveable in an axial direction of stationary shaft 8 and non-rotatable about stationary shaft 8. Stationary shaft 8 is fixedly supported on vehicle body 1. In addition, actuator (for instance, electromagnetic solenoid) 9 that biases friction member 7b toward friction member 7a is fixed to vehicle body 1.

Variable friction plate 7 allows friction member 7b to move in the axial direction (in a direction as indicated by arrow A1 in FIG. 1) by operation of actuator 9, thereby variably controlling a friction force that is generated between friction member 7a and friction member 7b. The operation of actuator 9 is controlled by control unit 10. Accordingly, by controlling the operation of actuator 9 by control unit 10, it is possible to vary a friction force applied to rotating shaft 3 and a pedal effort generated upon operating accelerator pedal 2. Meanwhile, the pedal effort varying mechanism is not particularly limited to the above-described mechanism, and may be such a mechanism that a pedal effort of an accelerator pedal is varied by using a motor.

Figure 3:
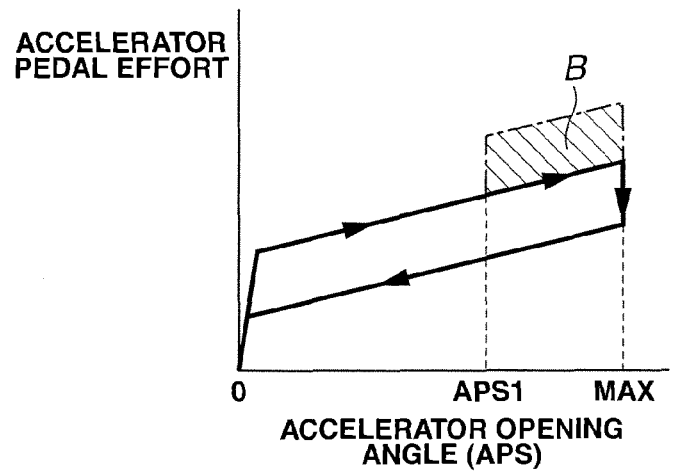
FIG. 3 is a characteristic diagram showing a characteristic of a base pedal effort of an accelerator pedal effort in the present invention.

FIG. 3 schematically shows a characteristic of a basic pedal effort, i.e., a base pedal effort of the accelerator pedal in the above embodiment. The base pedal effort exhibits an appropriate hysteresis in both an accelerator opening angle increasing direction and an accelerator opening angle reducing direction, and increases substantially in proportion to the accelerator opening angle.

Control unit 10 sets an accelerator opening angle threshold value relating to specific fuel consumption, more specifically, an accelerator opening angle threshold value at which an operating range is changed from an operating range in which the specific fuel consumption is relatively low (fuel consumption is good) to an operating range in which the specific fuel consumption is relatively high (fuel consumption is poor), on the basis of an operating condition of the vehicle or the engine. When the accelerator opening angle becomes larger than the accelerator opening angle threshold value (for instance, APS1), a predetermined increment (range B as indicated by hatch lines in FIG. 3) is added to the pedal effort of the accelerator pedal. On the other hand, as explained later, when a predetermined period has elapsed from a time at which increase in pedal effort is started and the accelerator opening angle has been reduced to a predetermined increment cancellation threshold value, the above-described increment of the pedal effort of the accelerator pedal is cancelled.

Figure 4:
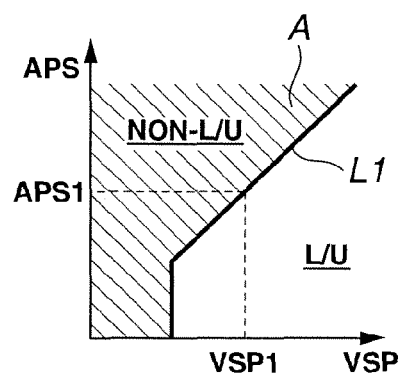
FIG. 4 is a characteristic diagram showing a characteristic of a lockup range in an embodiment relating to a lockup clutch.

As an example, an embodiment in which the accelerator opening angle threshold value is set corresponding to engagement and disengagement of a lockup clutch in a torque converter type automatic transmission is explained by referring to FIG. 4. As is well known, the lockup clutch is a mechanism for directly coupling an input side of a torque converter and an output side thereof to each other. As shown in the characteristic diagram of FIG. 4, changeover between engagement and disengagement of the lockup clutch is controlled on the basis of vehicle speed VSP and accelerator opening angle APS. The lockup clutch is in the disengagement state within a non-lockup (non-L/U) range (range A as indicated by hatch lines in FIG. 4) in which the vehicle speed is low and accelerator opening angle APS is large. The lockup clutch is in the engagement state within a lockup (L/U) range in which the vehicle speed is high and accelerator opening angle APS is small. Specific fuel consumption is relatively deteriorated in the disengagement state of the lockup clutch, as compared to that in the engagement state of the lockup clutch. Therefore, in this embodiment, the non-lockup range is regarded as an operating range in which the specific fuel consumption is high, and the lockup range is regarded as an operating range in which the specific fuel consumption is low. In this condition, when accelerator opening angle APS is increased upon changing from the lockup range to the non-lockup range, increase in pedal effort of the accelerator pedal is executed.

By thus stepwise increasing the pedal effort of the accelerator pedal at accelerator opening angle threshold value APS1 corresponding to disengagement of the lockup clutch, it is possible to enhance a driver's feeling of reaction to depression of accelerator pedal 2. As a result, excessive depression of accelerator pedal 2 can be suppressed, and at the same time, it can be noticed to the driver that an operating condition is shifted to the operating condition in which specific fuel consumption is high (that is, fuel consumption is poor). Specifically, accelerator opening angle APS at which the lockup clutch is changed from the engagement state to the disengagement state is not constant but variable in accordance with vehicle speed VSP. Although accelerator opening angle APS at which the lockup clutch is changed to the disengagement state thus varies, it is possible to give the driver information that the range in which the specific fuel consumption is relatively low is shifted to the range in which the specific fuel consumption is relatively high by varying the pedal effort of accelerator pedal 2 corresponding to accelerator opening angle APS (that is, by enhancing the driver's feeling of reaction to depression of accelerator pedal 2).

Figure 5:
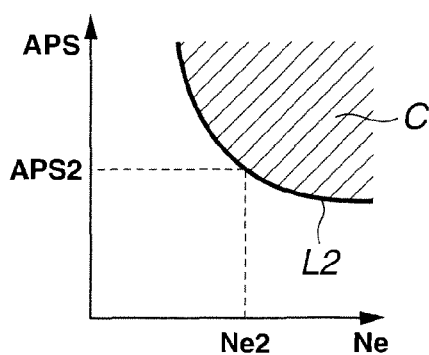
FIG. 5 is a characteristic diagram showing a characteristic of a fuel amount increase range in an embodiment relating to the fuel amount increase range.

Next, referring to FIG. 5, an embodiment in which the accelerator opening angle threshold value is set corresponding to a fuel increasing range on a high load side of the engine is explained. FIG. 5 shows the fuel increasing range (range C as indicated by hatch lines) which is determined on the basis of accelerator opening angle APS and engine speed Ne. The fuel increasing range C is generated by, for instance, changeover of setting of air-fuel ratio or changeover of combustion type (for instance, between stratified charge combustion and uniform combustion), and shows a range in which accelerator opening angle APS is large and engine speed Ne is high as shown in FIG. 5. Accordingly, an accelerator opening angle value corresponding to engine speed Ne (for instance, Ne2) at a point on boundary line L2 as shown in FIG. 5 becomes accelerator opening angle threshold value APS2. Accordingly, if accelerator opening angle APS becomes larger than accelerator opening angle threshold value APS2, a predetermined pedal effort increment is added to the base pedal effort. By controlling the accelerator pedal effort as shown in FIG. 5, it is possible to enhance the driver's feeling of reaction to depression of accelerator pedal 2 when an operating condition of the engine is shifted to the fuel increasing range. Accordingly, it is possible to accurately give the driver information that an operating condition of the engine is shifted from the range in which specific fuel consumption is relatively low to the range in which specific fuel consumption is relatively high. As a result, the driver can be prevented from subconsciously depressing accelerator pedal 2 within the range in which specific fuel consumption is high, and therefore, fuel consumption can be enhanced.

Figure 6:
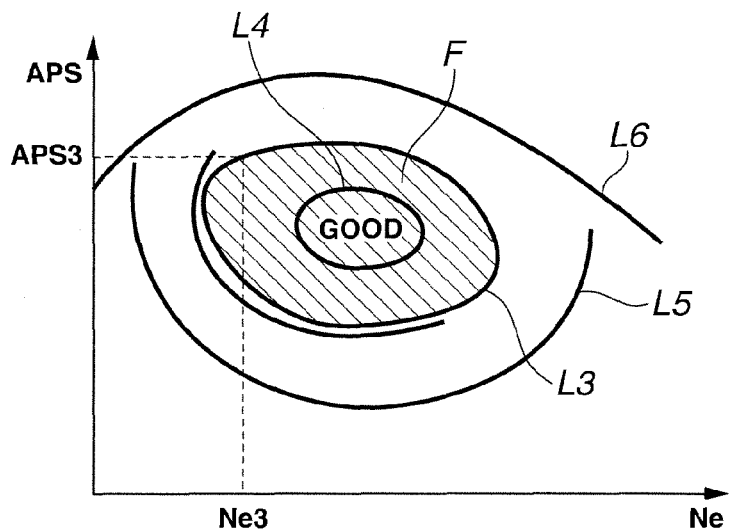
FIG. 6 is a characteristic diagram showing a characteristic of constant fuel consumption curves in an embodiment relating to a fuel consumption characteristic of an engine.

Next, referring to FIG. 6, an embodiment in which the accelerator opening angle threshold value is set on the basis of a characteristic of fuel consumption of the engine is explained. FIG. 6 shows constant fuel consumption curves L3-L6 each given at constant specific fuel consumption with respect to accelerator opening angle APS and engine speed Ne as parameters. In this embodiment, as indicated by constant fuel consumption curves L3-L6, fuel consumption is most excellent within a medium-speed medium-load range. Range F as indicated by hatch lines is regarded as a good fuel consumption range, and a boundary on a high load side (i.e., on a large accelerator opening angle side) of the range F is regarded as a boundary between the good fuel consumption range and a deteriorated fuel consumption range. Accordingly, a value of the accelerator opening angle corresponding to engine speed Ne (for instance, Ne3) at a point on the boundary line is accelerator opening angle threshold value APS3. When accelerator opening angle APS becomes larger than accelerator opening angle threshold value APS3, a predetermined pedal effort increment is added to the base pedal effort.

By thus controlling the accelerator pedal effort, it is possible to enhance the driver's feeling of reaction to depression of accelerator pedal 2 when an operating condition of the engine exceeds the good fuel consumption range F. Accordingly, it is possible to accurately give the driver information that an operating condition of the engine is shifted from the range in which specific fuel consumption is relatively low to the range in which specific fuel consumption is relatively high. As a result, the driver can be prevented from subconsciously depressing accelerator pedal 2 within the range in which specific fuel consumption is high, and therefore, fuel consumption can be enhanced.

Figure 7:
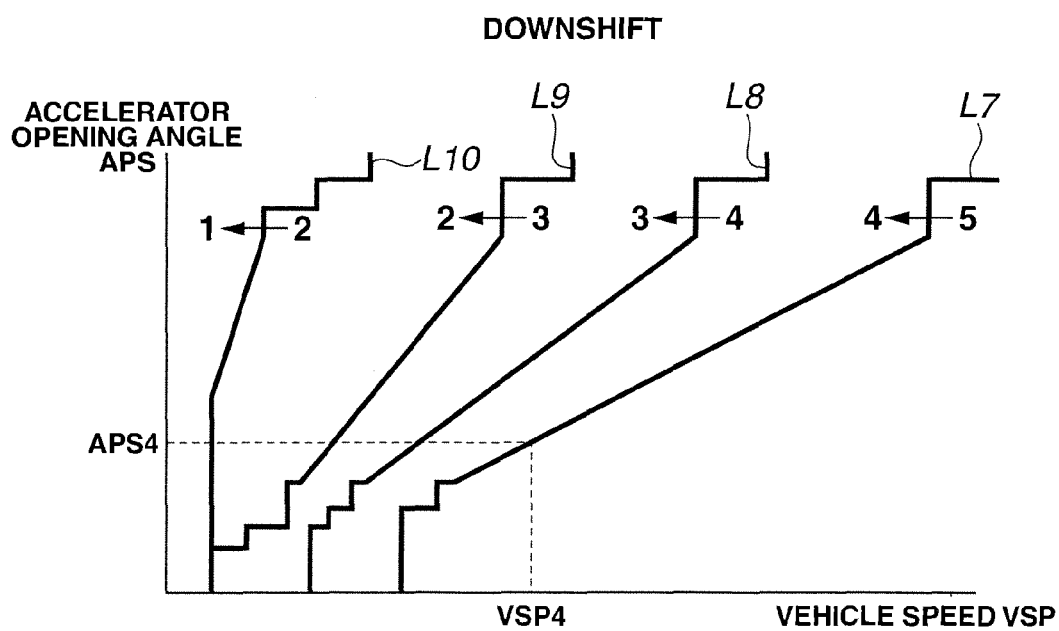
FIG. 7 is a shift diagram showing an embodiment relating to a downshift of an automatic transmission.

Next, referring to FIG. 7, an embodiment in which the accelerator opening angle threshold value is set corresponding to downshift (automatic shift to low speed) of the automatic transmission is explained. FIG. 7 is a shift diagram of a five speed automatic transmission as one example. As shown in FIG. 7, shift control is carried out on the basis of vehicle speed VSP and accelerator opening angle APS. Since generally specific fuel consumption at high speed (high gear stage) is lower than that at low speed (low gear stage), shift line L7 indicating shift from fifth speed to fourth speed is regarded as a boundary line when changeover from a range in which specific fuel consumption is relatively low to a range in which specific fuel consumption is relatively high is carried out. Accordingly, when a value of vehicle speed VSP is, for instance, VSP4 at a point on shift line L7, a value of the accelerator opening angle APS4 which corresponds to the value VSP of vehicle speed is set as the accelerator opening angle threshold value APS4. Similarly, accelerator opening angle threshold values may be set on shift lines L8-L10 at other speeds. If accelerator opening angle APS becomes larger than the accelerator opening angle threshold value APS4, a predetermined pedal effort increment is added to the base pedal effort. By thus controlling the accelerator pedal effort, it is possible to enhance the driver's feeling of reaction to depression of accelerator pedal 2 when the automatic transmission is shifted to the low speed in which specific fuel consumption is relatively high.

In the respective embodiment as described above, increase in pedal effort of accelerator pedal 2 is executed so as to meet with timing of changeover from the range in which specific fuel consumption is relatively low to the range in which specific fuel consumption is relatively high. However, the increase in pedal effort can be executed immediately before the changeover is actually carried out (that is, at a stage at which the accelerator opening angle is slightly smaller than that at a boundary point of the changeover), so that the driver can be previously informed of deterioration in fuel consumption. In such a case, the driver can predict deterioration in fuel consumption, thereby intentionally avoiding shift to the range in which specific fuel consumption is relatively high. As a result, fuel consumption can be enhanced.

Next, a difference in function between the above-described conventional art and the present invention is explained. As described in the conventional art, there is a problem that rattling of the accelerator pedal 2 occurs contrary to the driver's intention in a case where an accelerator pedal effort is increased to be larger than the base pedal effort when the accelerator opening angle has reached a given accelerator opening angle (a pedal effort increasing accelerator opening angle), and this increment of the pedal effort is reduced when the accelerator opening angle is decreased to be smaller than the pedal effort increasing accelerator opening angle.

Figure 8:
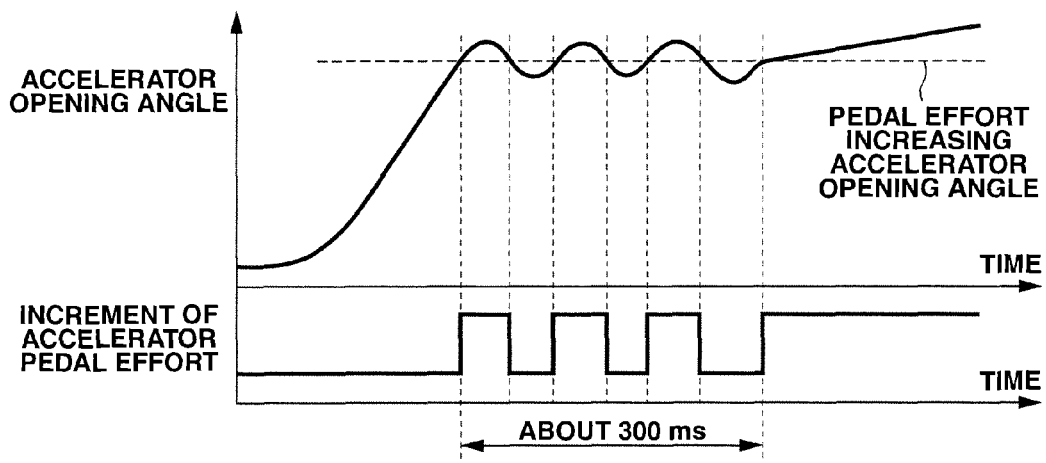
FIG. 8 is a timing chart showing variation in accelerator opening angle and increment of the pedal effort of the accelerator pedal with time in a comparative example.

FIG. 8 is a timing chart showing behavior in the conventional art as a comparative example. When the accelerator opening angle exceeds a predetermined pedal effort increasing accelerator opening angle upon increasing the accelerator opening angle along with depression of the accelerator pedal, an accelerator pedal effort is stepwise increased from the base pedal effort. The accelerator pedal effort is thus rapidly and largely increased to thereby cause a phenomenon that the accelerator pedal is sprung back and pushed back by momentum of the increase in accelerator pedal effort. As a result, the accelerator opening angle becomes not larger than the pedal effort increasing accelerator opening angle, so that the increment of the pedal effort is cancelled to thereby immediately reduce the accelerator pedal effort to the base pedal effort on an accelerator pedal return side (i.e., in the accelerator opening angle reducing direction).

Since the driver has intended to increase the accelerator opening angle and the accelerator opening angle has exceeded the pedal effort increasing accelerator opening angle due to the intended increase in accelerator opening angle, accelerator pedal 2 is further depressed by the driver even after the accelerator opening angle is reduced to be not larger than the pedal effort increasing accelerator opening angle. Therefore, the accelerator opening angle exceeds again the pedal effort increasing accelerator opening angle, so that stepwise increase in pedal effort is executed again.

Then, when the accelerator pedal effort is largely increased, the accelerator pedal is sprung back and pushed back again, so that the accelerator opening angle becomes not larger than the pedal effort increasing accelerator opening angle to thereby cause reduction of the pedal effort. After that, the accelerator pedal is further depressed by the driver so that the accelerator pedal effort is stepwise increased. Such change in accelerator opening angle and accelerator pedal effort repeatedly occurs. That is, as shown in FIG. 8, immediately after the accelerator opening angle has reached the predetermined pedal effort increasing accelerator opening angle, there occurs rattling of the accelerator pedal (i.e., the accelerator opening angle) with respect to this pedal effort increasing accelerator opening angle, i.e., so-called hunting phenomenon.

In contrast, in the respective embodiments of the present invention, after the pedal effort is increased, cancellation of increment of the pedal effort of the accelerator pedal is inhibited during a predetermined period, and increase in pedal effort is maintained. As a result, it is possible to ensure avoidance of occurrence of the above-described rattling of the accelerator pedal.

Figure 9:
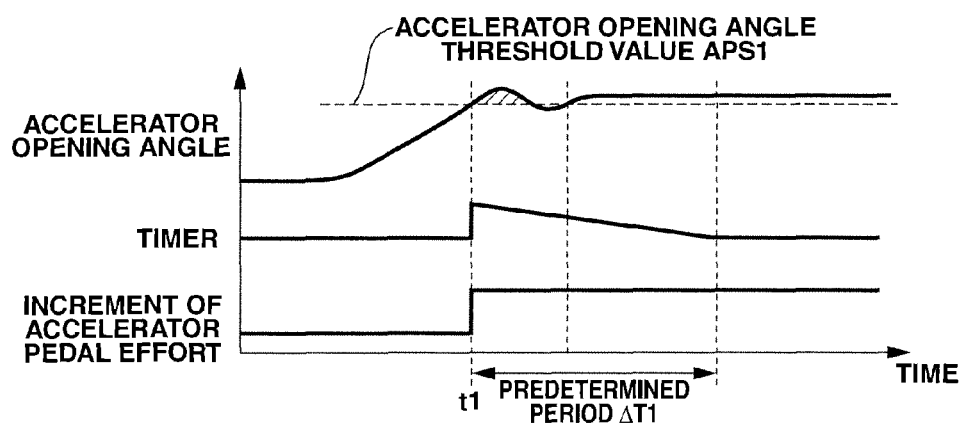
FIG. 9 is a timing chart showing variation in accelerator opening angle and increment of the pedal effort of the accelerator pedal with time in an embodiment in which a predetermined period starts with increase in pedal effort.

FIG. 9 is a timing chart showing behavior in the embodiment of the present invention. When the accelerator opening angle exceeds a predetermined accelerator opening angle threshold value (for instance, APS1) upon depression of accelerator pedal 2 by the driver, pedal effort of accelerator pedal 2 is largely increased from the base pedal effort (the base pedal effort in the accelerator opening angle increasing direction).

When the accelerator pedal effort is thus largely increased, there occurs a phenomenon that the accelerator pedal is sprung back and pushed back by momentum of the increase in accelerator pedal effort. The accelerator opening angle will occasionally become not larger than the accelerator opening angle threshold value APS1 due to this phenomenon. However, in this embodiment, an increment of pedal effort is kept during predetermined period $\Delta T1$ (for instance, several seconds to several tens of seconds) from a time at which increase in pedal effort is started. Therefore, the accelerator pedal effort is merely reduced by an amount of hysteresis (see FIG. 3) along with inversion in the movement direction (from the increasing direction to the reducing direction), that is, by a difference between the base pedal effort in the increasing direction and the base pedal effort in the reducing direction. That is, as a result, the pedal effort increment is added to the base pedal effort in the reducing direction.

Since the driver has intended to increase the accelerator opening angle and the accelerator opening angle has exceeded the accelerator opening angle threshold value APS1 due to the intended increase in accelerator opening angle, accelerator pedal 2 is further depressed by the driver even after the accelerator opening angle is reduced to be not larger than the accelerator opening angle threshold value APS1. Therefore, the accelerator opening angle exceeds again the accelerator opening angle threshold value APS1. However, at this time, increase in pedal effort is not executed again because the pedal effort increment was already added. The accelerator pedal effort is merely increased by an amount of hysteresis (see FIG. 3) along with inversion in the movement direction (from the reducing direction to the increasing direction), that is, by a difference between the base pedal effort in the reducing direction and the base pedal effort in the increasing direction. As a result, a depression force that is applied to accelerator pedal 2 and a pedal effort of accelerator pedal 2 are spontaneously balanced with each other. Accordingly, as shown in FIG. 9, it is possible to ensure avoidance of occurrence of rattling of accelerator pedal 2 contrary to the driver's intention immediately after the accelerator opening angle has reached the accelerator opening angle threshold value APS1.

Then, after the predetermined period $\Delta T1$ has elapsed, if a predetermined increase cancellation condition (such that the accelerator opening angle is reduced to be not larger than a predetermined cancellation threshold value that is smaller than the opening angle threshold value APS1) is fulfilled, the pedal effort increment is cancelled so that the pedal effort is rapidly reduced to the base pedal effort. Further, in the embodiment as shown in FIG. 9, the accelerator opening angle is larger than the accelerator opening angle threshold value APS1 even after the predetermined period ΔT1 has elapsed. Therefore, the increase cancellation condition is not fulfilled, and therefore, cancellation of increase in pedal effort is not executed.

Figure 10:
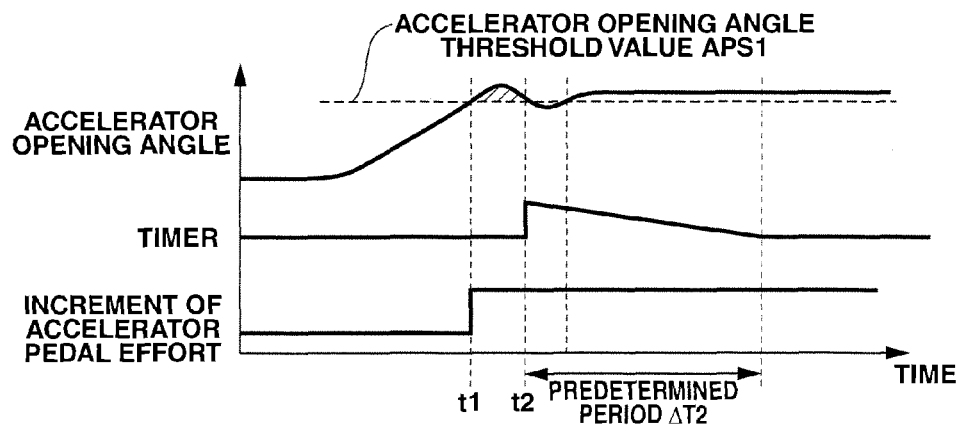
FIG. 10 is a timing chart showing variation in accelerator opening angle and increment of the pedal effort of the accelerator pedal with time in an embodiment in which a predetermined period starts when the accelerator opening angle is decreased to an opening angle threshold value after the pedal effort is increased.

In the embodiment as shown in FIG. 9, a time at which the predetermined period ΔT1 is started is set to time t1 at which increase in pedal effort is started and countdown of a timer is started. However, the present invention is not limited to this embodiment. For instance, as shown in FIG. 10, a time at which predetermined period ΔT2 is started may be set to time t2 at which the accelerator opening angle is reduced to the accelerator opening angle threshold value APS1 after increase in pedal effort is started.

Figure 11:
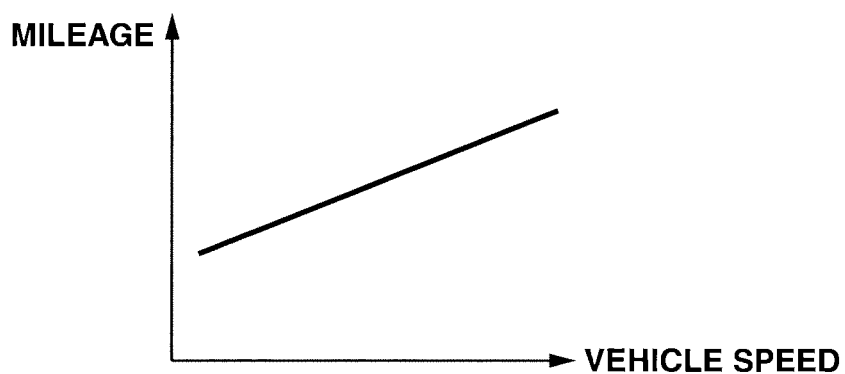
FIG. 11 is a characteristic diagram showing a relationship between vehicle speed and running mileage in a case where the predetermined period is determined with respect to the running mileage.

Further, the present invention is not limited to the above-described embodiment in which the time-based predetermined period is used. For instance, running mileage may be used for the predetermined period. That is, cancellation of increment of the pedal effort can be inhibited until running mileage reaches a predetermined running mileage (for instance, about several hundreds of meters) after the pedal effort is increased. In this case, the running mileage may be variably set in accordance with the vehicle speed such that the predetermined period is substantially a constant time. Specifically, the running mileage used for the predetermined period can be set to increase as the vehicle speed increases, that is, in proportion to the vehicle speed. As a result, the predetermined period can be determined as substantially a constant time (see FIG. 11).

The above-described pedal effort increment may be simply a constant fixed value, but may be variably set on the basis of various conditions in order to better comply with an operating condition. As an example, the pedal effort increment may be set to a larger value as the accelerator opening angle threshold value to be set on the basis an operating condition becomes larger. As a result, it is possible to give clear information to the driver even under a condition that the primary base pedal effort is large.

Further, in a case where the pedal effort increment is thus variably set, the predetermined periods ΔT1, ΔT2 are preferably set to a longer (or larger) value as the pedal effort increment becomes larger. That is, as the pedal effort increment becomes larger, an amount of push-back of accelerator pedal 2 is increased. Therefore, by setting the predetermined periods to a longer value, it is possible to further ensure suppression of occurrence of rattling of accelerator pedal 2 contrary to the driver's intention.

On the other hand, the above-described predetermined periods ΔT1, ΔT2 may be set to a longer (or larger) value as the accelerator opening angle threshold value becomes smaller. As the accelerator opening angle threshold value becomes smaller, the pedal effort is stepwise increased at a stage in which the accelerator opening angle is small (that is, the base pedal effort is small). Therefore, there occurs a large influence which is caused due to the pedal effort increment, i.e., a so-called barrier feeling, so that accelerator pedal 2 is likely to be pushed back. Therefore, by setting the predetermined periods ΔT1, ΔT2 to a longer (or larger) value, it is possible to further ensure suppression of occurrence of rattling of accelerator pedal 2 contrary to the driver's intention.

FIG. 12 is a flow chart showing a flow of control of the accelerator pedal effort control device according to one embodiment of the present invention. FIG. 12 shows an example of control of the embodiment as shown in FIG. 9 in which the predetermined period is started at the time at which increase in pedal effort is started. Basic processing of the control in the other embodiments is the same as in this embodiment.

In step S11, it is judged whether or not the pedal effort is increasing. If the pedal effort is increasing, the logic flow proceeds to step S12 in which countdown of a timer that measures predetermined time (predetermined period) ΔT1 is carried out. Meanwhile, in a case where running mileage is used for the predetermined period, countdown of a counter that measures the running mileage is carried out.

On the other hand, if the pedal effort is not increasing, that is, increase in pedal effort is not carried out, the logic flow proceeds to step S13 in which it is judged whether or not the accelerator opening angle exceeds the accelerator opening angle threshold value (for instance, APS1). If the pedal effort is not increasing and the accelerator opening angle exceeds the accelerator opening angle threshold value, the logic flow proceeds to step S14 through step S11 and step S13. In step S14, the pedal effort is stepwise increased by a predetermined increment as explained above. Then, the logic flow proceeds to step S15 in which at the timing immediately after increase in pedal effort is started, the timer that measures the predetermined period ΔT1 (or the counter that measures the running mileage ΔT1) is set to the predetermined period ΔT1 (or the running mileage). That is, measurement of the predetermined period ΔT1 is started. On the other hand, if the pedal effort is not increasing and the accelerator opening angle is not larger than the accelerator opening angle threshold value, the logic flow proceeds to step S16 in which the timer (the counter) is cleared by setting to 0 (zero).

In step S17, it is judged whether or not the countdown of the timer has reached 0, that is, the predetermined period ΔT1 has elapsed. If the predetermined period ΔT1 has not elapsed, the logic flow proceeds to step S18 in which the pedal effort is kept increasing. Then, at a time at which the predetermined period ΔT1 has elapsed, the logic flow proceeds from step S17 to step S19 in which it is judged whether or not a predetermined pedal effort-increase cancellation condition is fulfilled. For instance, it is judged whether or not the accelerator opening angle is not larger than a predetermined cancellation threshold value. This cancellation threshold value is set to a value lower than the above-described opening angle threshold value at which the pedal effort increment is provided.

If the pedal effort-increase cancellation condition is fulfilled, the logic flow proceeds to step S20 in which it is judged whether or not a return speed of the accelerator pedal is not less than a predetermined value, that is, whether or not a reduction speed of the accelerator opening angle is high. If the return speed of the accelerator pedal is high, it is judged that the driver highly intends to cancel increase in pedal effort. The logic flow proceeds to step S21 in which the increase in pedal effort is immediately cancelled. On the other hand, if the return speed of the accelerator pedal is less than the predetermined value, the logic flow proceeds to step S22 in which it is judged that the driver's intention to cancel increase in pedal effort is low, and the pedal effort increment is gradually reduced.

Further, in the above-described respective embodiments, a position (an amount of depression) of accelerator pedal 2 is detected as the accelerator opening angle. Accordingly, the amount of depression of accelerator pedal 2 is substantially identical to the accelerator opening angle. However, instead of the accelerator opening angle, for instance, an opening angle of a throttle valve that is operated in association with accelerator pedal 2 can be detected to thereby execute the control of the present invention.

Furthermore, the accelerator pedal effort control device according to the present invention may be applied to other vehicles, for instance, an electric vehicle, a hybrid vehicle, etc. without being limited to application to a vehicle employing only an internal combustion engine as a driving source.

The invention claimed is:

1. An accelerator pedal effort control device comprising:
an accelerator opening angle sensor configured to sense an accelerator opening angle that is varied by operating an accelerator pedal of a vehicle;
a pedal effort varying mechanism configured to vary a pedal effort of the accelerator pedal; and
a control unit configured to:
set an accelerator opening angle threshold value relating to specific fuel consumption on the basis of an operating condition of the vehicle,
add a predetermined increment to the pedal effort of the accelerator pedal when the accelerator opening angle becomes larger than the accelerator opening angle threshold value, and
inhibit cancellation of the increment of the pedal effort until a predetermined time elapses after the pedal effort of the accelerator pedal is increased,
wherein the control unit is configured to inhibit cancellation of the increment of the pedal effort until said predetermined time elapses after the pedal effort of the accelerator pedal is increased even when the accelerator opening angle becomes lower than the accelerator opening angle threshold value during said predetermined time.

2. The accelerator pedal effort control device as claimed in claim 1, wherein as the increment of the pedal effort becomes larger, the predetermined time is set longer.

3. The accelerator pedal effort control device as claimed in claim 1, wherein as the accelerator opening angle threshold value becomes smaller, the predetermined time is set longer.

4. The accelerator pedal effort control device as claimed in claim 1, wherein the accelerator opening angle threshold value is set at a boundary between an operating range in which the specific fuel consumption is relatively low and an operating range in which the specific fuel consumption is relatively high.

5. The accelerator pedal effort control device as claimed in claim 1, wherein the predetermined time is started at a time at which the increase in pedal effort is started.

6. The accelerator pedal effort control device as claimed in claim 1, wherein the predetermined time is started at a time at which the accelerator opening angle is reduced to the accelerator opening angle threshold value after the pedal effort of the accelerator pedal is increased.

7. An accelerator pedal effort control device comprising:
an accelerator opening angle sensor configured to sense an accelerator opening angle that is varied by operating an accelerator pedal of a vehicle;
a pedal effort varying mechanism configured to vary a pedal effort of the accelerator pedal; and
a control unit configured to:
set an accelerator opening angle threshold value relating to specific fuel consumption on the basis of an operating condition of the vehicle,
add a predetermined increment to the pedal effort of the accelerator pedal when the accelerator opening angle becomes larger than the accelerator opening angle threshold value, and
inhibit cancellation of the increment of the pedal effort until a predetermined period elapses after the pedal effort of the accelerator pedal is increased,
wherein the predetermined period is defined in terms of running mileage.

8. The accelerator pedal effort control device as claimed in claim 7, wherein as vehicle speed becomes higher, the running mileage is set longer.

9. An accelerator pedal effort control device comprising:
an accelerator opening angle sensor configured to sense an accelerator opening angle that is varied by operating an accelerator pedal of a vehicle;
a pedal effort varying mechanism configured to vary a pedal effort of the accelerator pedal; and
a control unit configured to:
set an accelerator opening angle threshold value relating to specific fuel consumption on the basis of an operating condition of the vehicle,
add a predetermined increment to the pedal effort of the accelerator pedal when the accelerator opening angle becomes larger than the accelerator opening angle threshold value, and
inhibit cancellation of the increment of the pedal effort until a predetermined period elapses after the pedal effort of the accelerator pedal is increased,
wherein as the increment of the pedal effort becomes larger, the predetermined period is set longer.

10. An accelerator pedal effort control device comprising:
an accelerator opening angle sensor configured to sense an accelerator opening angle that is varied by operating an accelerator pedal of a vehicle;
a pedal effort varying mechanism configured to vary a pedal effort of the accelerator pedal; and
a control unit configured to:
set an accelerator opening angle threshold value relating to specific fuel consumption on the basis of an operating condition of the vehicle,
add a predetermined increment to the pedal effort of the accelerator pedal when the accelerator opening angle becomes larger than the accelerator opening angle threshold value, and
inhibit cancellation of the increment of the pedal effort until a predetermined period elapses after the pedal effort of the accelerator pedal is increased,
wherein as the accelerator opening angle threshold value becomes smaller, the predetermined period is set longer.

11. An accelerator pedal effort control device comprising:
an accelerator opening angle sensor configured to sense an accelerator opening angle that is varied by operating an accelerator pedal of a vehicle;
a pedal effort varying mechanism configured to vary a pedal effort of the accelerator pedal; and
a control unit configured to:
set an accelerator opening angle threshold value relating to specific fuel consumption on the basis of an operating condition of the vehicle,
add a predetermined increment to the pedal effort of the accelerator pedal when the accelerator opening angle becomes larger than the accelerator opening angle threshold value, and
inhibit cancellation of the increment of the pedal effort until a predetermined period elapses after the pedal effort of the accelerator pedal is increased,
wherein the predetermined period is started at a time at which the accelerator opening angle is reduced to the accelerator opening angle threshold value after the pedal effort of the accelerator pedal is increased.

* * * * *